July 6, 1965 J. A. RICKARD 3,193,011
METHOD FOR RESTORING LOST CIRCULATION
Filed May 18, 1962
FIG. 1.
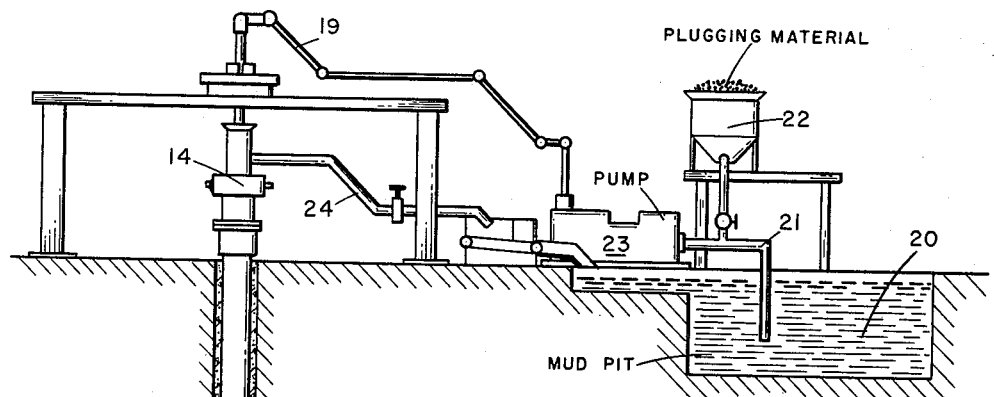
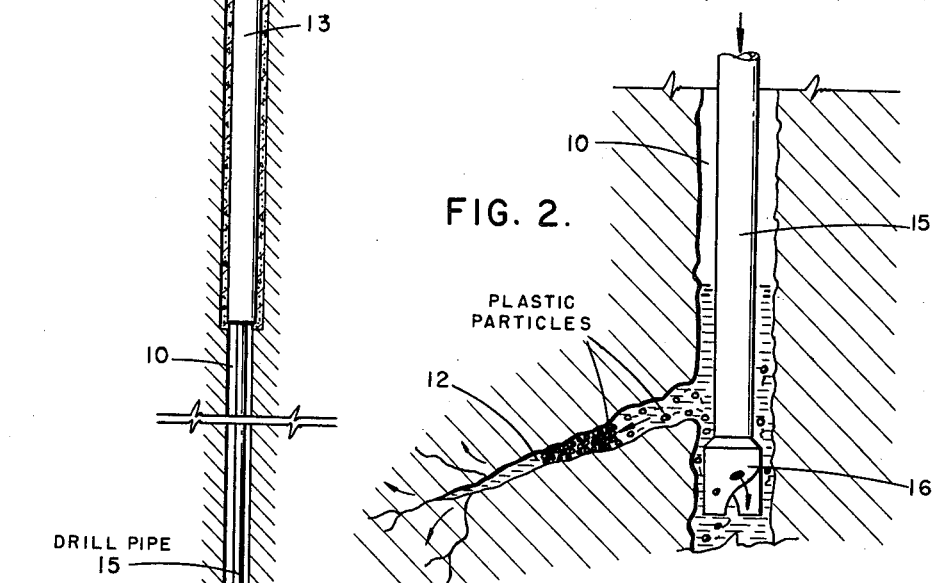
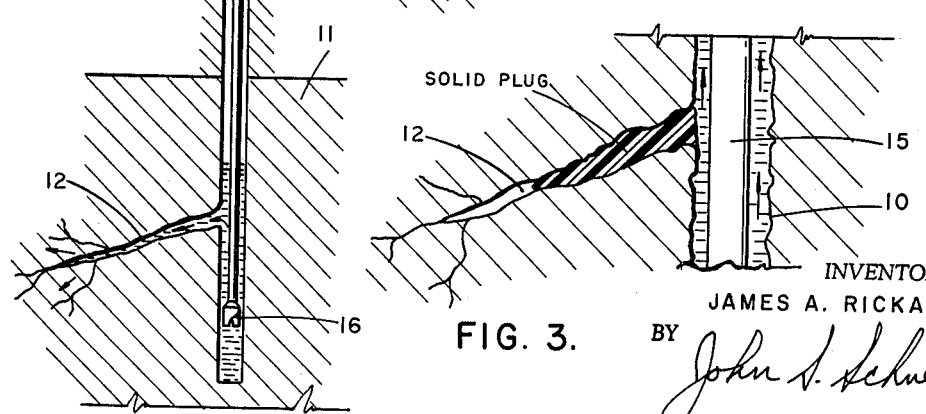
FIG. 2.
FIG. 3.
INVENTOR.
JAMES A. RICKARD,
BY
ATTORNEY.

United States Patent Office 3,193,011
Patented July 6, 1965

3,193,011
METHOD FOR RESTORING LOST CIRCULATION
James A. Rickard, Houston, Tex., assignor, by mesne assignments, to Esso Production Research Company, Houston, Tex., a corporation of Delaware
Filed May 18, 1962, Ser. No. 195,844
3 Claims. (Cl. 166—33)

The present invention concerns sealing zones of loss of drilling fluid in well bores in order to restore lost circulation.

In drilling wells by the rotary method circuluating drilling fluid is frequently lost. Lost circulation often occurs because the well bore has penetrated a highly porous formation or a cracked formation, and the circulating fluid or drilling mud that is pumped into the well bore through the rotary drill pipe enters the cracks in the cracked formation or the interstices in the porous formation and is not returned to the surface.

Numerous more or less effective techniques have been used in the past to plug or bridge such zones of loss to restore drilling fluid circulation. One of these methods involves cementing the zone of loss. This technique frequently is more effective than any other method of repair; however, it has disadvantages in that it requires special trucks and equipment and therefore is costly, both in materials and rig time. In addition, in bradenhead cementing the cement is not necessarily placed in the zone of loss where it is desired. Still another disadvantage in the cementing method is the ever present danger of flash setting of the cement or of miscalculating the position of the cement. If the cement sets up in the wrong interval of the hole, additional difficulties result.

Another technique commonly used to attempt to restore lost drilling fluid circulation involves slugging large quantities of lost returns material into the circulating fluid and pumping this slug of material into the hole to adjacent the presumed area of lost returns or zone of loss. In this technique it is desired that the lost returns material fill the zone of loss and bridge it off. Advantages of this method are that no round trips to install cementing equipment are required, and no special pump trucks or other equipment are needed to pump the material in place. However, this technique has disadvantages that usually outweigh its advantages. The operation is seldom effective in restoring lost circulation. Investigation has shown that in numerous cases the slug technique was inferior both to the cementing method and to simply waiting for the fracture to heal itself.

The present invention combines the desirable features of these two techniques without the disadvantages thereof. Drilling fluid circulation is restored without using special equipment or trucks or special round trips, and the effective, strong material used to fill the zone of loss insures that even should incorrect placement occur, no undesirable consequences result.

Briefly, the method comprises adding to the drilling fluid solid, partially polymerized, thermo-setting plastic granules of a uniform size and displacing the mixture through the drill string and into the borehole so that it enters a zone of loss in the well bore where the plastic granules set and form a solid plastic plug.

Thus, a primary object of the present invention is to provide an improved technique for restoring lost drilling fluid circulation.

The above object and other objects and advantages of the invention will be apparent from a more detailed description of the invention when taken with the drawings wherein:

FIG. 1 is a schematic illustration of a well bore being drilled through a zone of lost returns and the surface equipment used to practice the method of the invention;

FIG. 2 is a schematic view illustrating another step of the invention in which the plastic granules and drilling fluid carrier are flowing into the zone of lost returns and the plastic granules are depositing therein; and FIG. 3 is a schematic view illustrating a further step of the method of the invention in which the granules have aggregated into a solid plastic plug in the zone of lost returns.

For a more complete description of the invention, reference now is made to the drawings in greater detail. In FIG. 1 is shown a borehole 10 penetrating a formation 11 containing a crack or zone of loss 12 extending laterally or radially from said borehole. The upper portion of borehole 10 is conventionally cased and cemented, as indicated at 13, and at the surface of the earth conventional wellhead equipment 14 is illustrated. A circulating fluid returns conduit 24, which feeds into a mud pit 20, is connected to wellhead 14. A drill string 15, provided with a drill bit 16 on its lower end, is shown positioned in borehole 10. It extends upwardly through wellhead 14 and is connected to one end of a conduit 19, the other end of which is connected to the discharge end of a pump 23. Circulating fluid is fed to pump 23 from mud pit 20 through a conduit 21 to which is connected a depository of plugging material, bin 22.

The operation of the method is as follows. When drill bit 16 penetrates formation 11 and traverses the zone of loss 12, drilling fluid being circulated from mud pit 20 through conduit 21, pump 23, conduit 19, and drill string 15 flows into the zone of loss 12, as indicated by the arrows (see FIG. 1). The drilling fluid not lost to zone 12 flows up the annulus surrounding drill pipe 15 and flows out returns conduit 24 into mud pit 20. To plug zone of loss 12 to prevent loss of the circulating fluid, the plugging material composed of granules of a partially polymerized thermosetting plastic contained in bin 22 is deposited in conduit 21 and along with drilling fluid from mud pit 20 is pumped by pump 23 into borehole 10 through conduit 19 and drill string 15 and placed adjacent formation 11 and zone of loss 12 so that it will enter the zone of loss as indicated in FIG. 2.

Upon entering zone 12, the mixture or slurry of plastic granules and drilling fluid dehydrates and allows the plastic solid granules to aggregate and come in close contact with each other. Then, the heat of the formation causes the granules to bond and set, thereby developing high tensile strength. The time of setting is calculable from the type of resin and the heat of the formation, and it may be as small as one to four hours after placement.

The solid plug of plastic in zone of loss 12 is seen in FIG. 3.

The partially polymerized plastics are preferably of the phenol formaldehyde type in which the polymerization reaction is stopped before appreciable cross linking occurs, as for example, Resoles and Novolaks. These partially polymerized materials are still fusible and soluble in certain solvents; however, with the application of heat such as occurs in zone of loss 12, the granules melt and the cross linking reaction occurs, resulting in a hard infusible, insoluble material which forms the solid plug in zone of loss 12. Resoles and Novolaks are obtainable with almost any desired melting point over a wide range of temperatures and can be dissolved in a wide variety of solvents, such as methanol or acetone. A detailed discussion of Resoles and Novolaks may be found on page 16 and pages 131 and 132 of "Synthetic Resins and Allied Plastics," Third edition, by Morrell and Langton (Oxford University Press, 1951).

In the event, through some miscalculation, the slurry is not placed in the zone of loss 12, the plastic solid granules will not aggregate but instead will harden due to the heat in the well bore as individual particles in the drilling fluid. This does not develop tensile strength of the slurry as a whole but rather has the same effect as adding lost returns particles such as ground walnut hulls to the mud. Therefore, the slurry may be pumped up to the surface again where the solidified plastic particles may be removed if desired. Subsequent attempts to place the plastic in the zone of loss 12 can be made immediately.

Having fully described the nature, objects, advantages, and operation of the invention, I claim:

1. A method for restoring lost drilling fluid circulation in a borehole containing a zone of lost circulation extending laterally from the borehole in a cracked formation comprising the steps of:
   adding to a fluid capable of being circulated in said borehole small, solid particles consisting essentially of partially polymerized thermosetting plastic granules adapted to set at borehole temperatures;
   displacing said particles radially outwardly from said well bore into said zone of fluid loss in said cracked formation; and
   then ceasing displacement of said particles for a period of time sufficient to permit said particles to concentrate, defluidize, coagulate, and set in said zone of fluid loss to form a solid plastic plug in and thereby seal said zone of loss.

2. A method as recited in claim 1 in which said thermosetting plastic is of the phenol-formaldehyde type.

3. A method as recited in claim 1 in which said fluid capable of being circulated in the borehole comprises drilling fluid.

References Cited by the Examiner

UNITED STATES PATENTS

| | | | |
|---|---|---|---|
| Re. 23,393 | 7/51 | Kurtz et al. | 166—33 |
| 2,650,195 | 8/53 | Cardwell et al. | 166—33 |
| 2,812,161 | 11/57 | Mayhew | 166—33 |
| 2,823,753 | 2/58 | Henderson | 166—33 |

OTHER REFERENCES

Morrell and Langton: "Synthetic Resins and Allied Plastics," 3rd edition, Oxford University Press, N.Y., 1951 (pp. 16, 131 and 132 relied on).

BENJAMIN HERSH, *Primary Examiner.*

CHARLES E. O'CONNELL, *Examiner.*